United States Patent
Phillips

(12) United States Patent (10) Patent No.: US 6,644,641 B2
(45) Date of Patent: Nov. 11, 2003

(54) INTERCHANGEABLE LOCATING PIN ASSEMBLY FOR LOCATING MANUFACTURED PARTS

(75) Inventor: Randy Stuart Phillips, Roseville, MI (US)

(73) Assignee: Randy Phillips, Roseville, MI (US)

( * ) Notice: Subject to any disclaimer, the term of this patent is extended or adjusted under 35 U.S.C. 154(b) by 40 days.

(21) Appl. No.: 10/068,515

(22) Filed: Feb. 6, 2002

(65) Prior Publication Data

US 2003/0146556 A1 Aug. 7, 2003

(51) Int. Cl.[7] ................................................. B23Q 3/00
(52) U.S. Cl. ...................................................... 269/310
(58) Field of Search ................................ 269/309, 310, 269/47, 48.1, 50, 51, 52, 76

(56) References Cited

U.S. PATENT DOCUMENTS

| | | | |
|---|---|---|---|
| 3,537,701 A | * 11/1970 | Claycomb | .................. 269/309 |
| 4,500,079 A | 2/1985 | Morghen | |
| 4,801,225 A | 1/1989 | Morghen | |
| 4,834,358 A | * 5/1989 | Okolischan et al. | ........ 269/309 |
| 4,932,642 A | * 6/1990 | Salenbien et al. | .......... 269/309 |
| 5,722,648 A | 3/1998 | Groll et al. | |
| 5,788,225 A | 8/1998 | Iwata et al. | .................. 269/309 |
| 5,975,788 A | * 11/1999 | Cousins et al. | |

OTHER PUBLICATIONS

Pamphlet of "Round and Diamond Locating Pins", 1998, Carr Lane Manufacturing Co., St. Louis, MO.

* cited by examiner

*Primary Examiner*—Robert C. Watson
(74) *Attorney, Agent, or Firm*—Dobrusin & Thennisch PC

(57) ABSTRACT

The present invention generally relates to a locating pin assembly for use in precision applications that locate a manufactured part such as gauging or machining. The interchangeable locating pin assembly has: a locating pin housing having a body with an interior portion, and a flange; a locating pin having a tapered head for engaging the manufactured part at a single contact point, and a shank complementary in shape to the interior portion of the housing body; means for axially moving the locating pin relative to the housing between a first extended position, a second partially retracted position, and a third fully retracted position; and means for preventing movement of the pin relative to the housing. The assembly eliminates the need to custom-make a locating pin tailored to each part. The assembly can be made using standard commercial locating pins for use in many manufactured part precision locating applications.

18 Claims, 3 Drawing Sheets

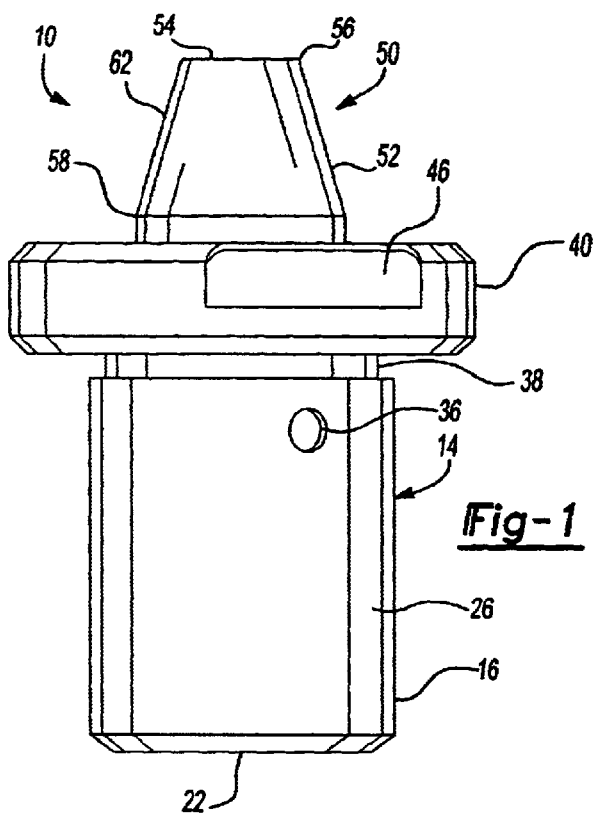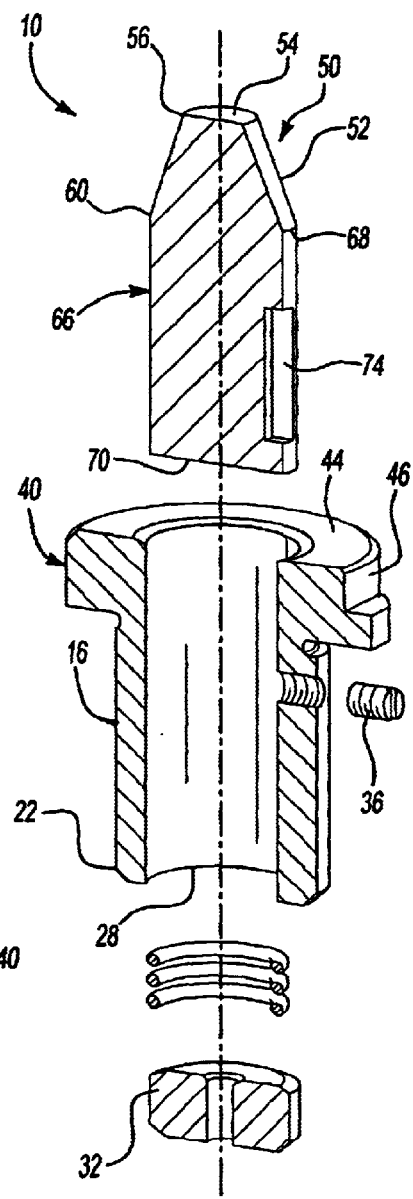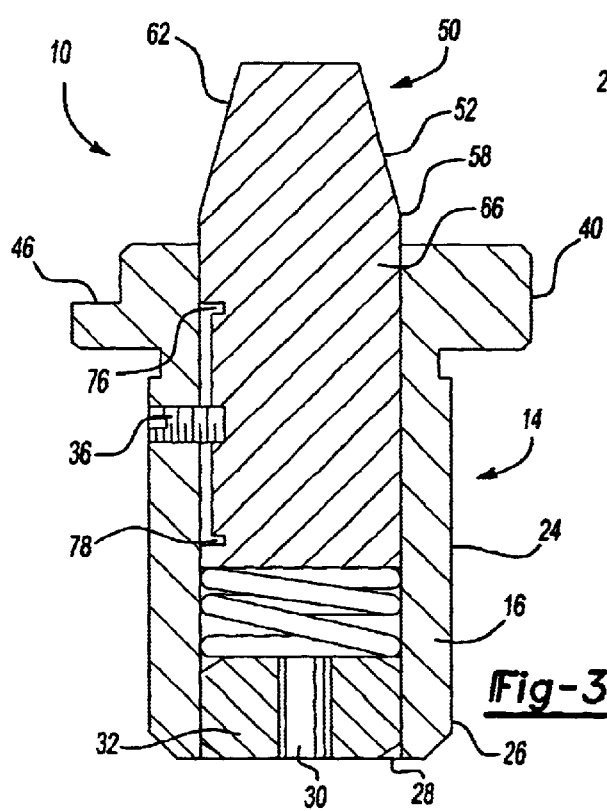
Fig-1
Fig-2
Fig-3

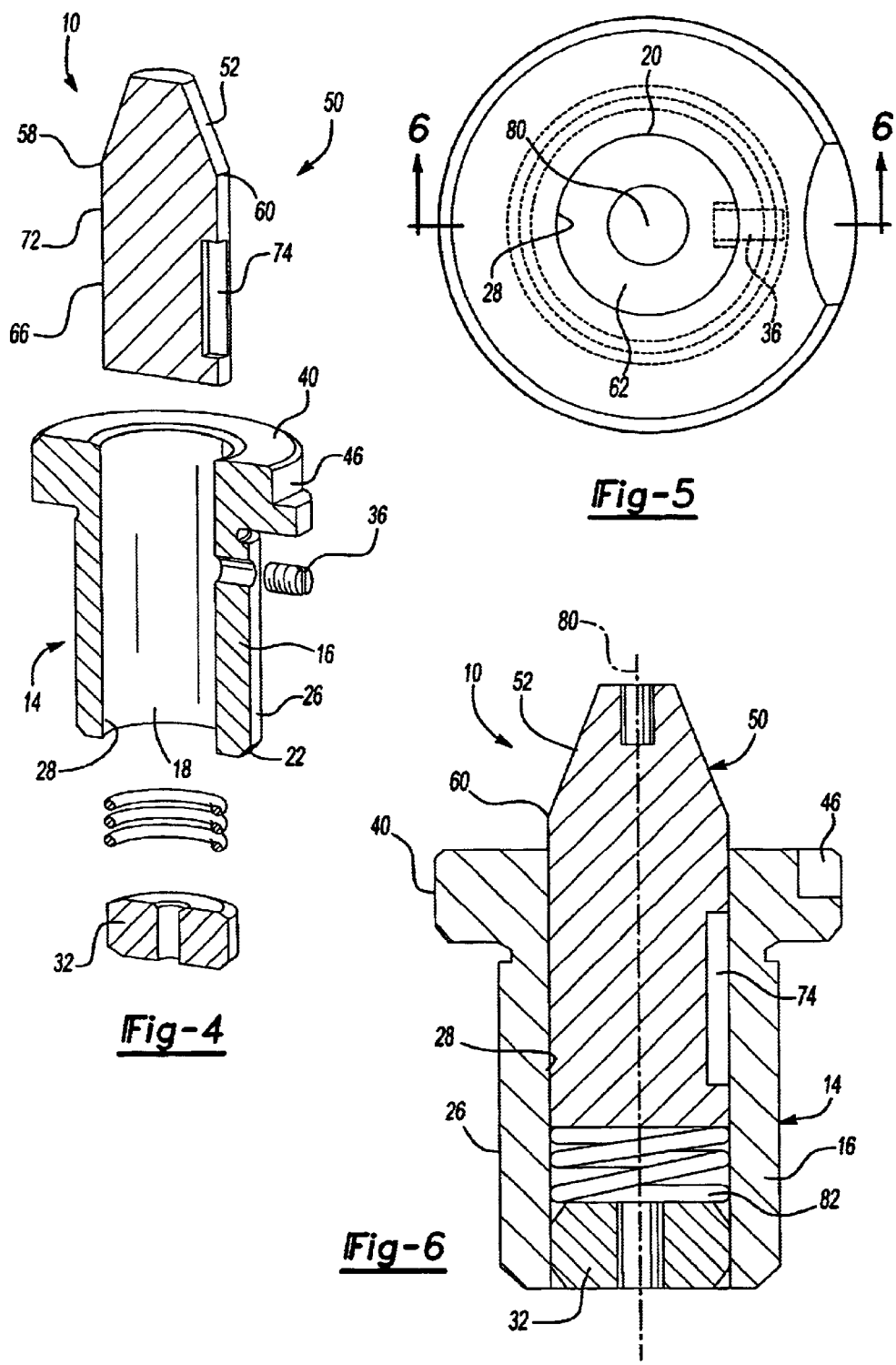

INTERCHANGEABLE LOCATING PIN ASSEMBLY FOR LOCATING MANUFACTURED PARTS

TECHNICAL FIELD

The present invention relates to a locating pin assembly for use in precision applications, more particularly for use in applications that locate a manufactured part such as gauging or machining.

BACKGROUND OF THE INVENTION

Certain applications require precision location of manufactured parts such as applications that use gauges, holding fixtures, workholding fixture dies, assembly fixtures, and test equipment. The manufactured parts may be made by conventional means well known in the manufacturing or machining arts such as, but not limited to, stamping, casting, molding, and extrusions. In a machining process, it is desirable to use a static locating pin assembly to locate holes in manufactured parts. In such a process, a static pin having a chamfered head and a shaft is permanently attached to a static pin housing. The housing has a flange that is then either press fit or lock-screwed into a mounting block for locating holes in a machining process. There is not a standard width flange used for dimensionally holding the manufactured part in such a process, therefore, a rest pad having a predefined width and a locating surface must be used in combination with the static pin to precisely locate the part. The static pin then operates to locate holes disposed within a manufactured part relative to one another. The manufactured part engages the static pin to locate the holes disposed within the manufactured part. The chamfered head is used to guide the manufactured part towards the shaft of the static pin. The tolerance of the holes capable of encircling the shaft is very narrow using such a static pin. The diameter of the hole on the part being checked must be larger than the diameter of the static pin to provide clearance between the hole and to allow the static pin to properly locate the hole. During manufacturing of the manufactured part, the clearance varies over time between the pin and each hole, thus, making it more difficult for the static pin to properly locate each hole.

Another application requiring precision location of manufactured parts is in the gauging process. In the gauging process, a tapered pin assembly is used to locate holes in manufactured parts. Each assembly is typically custom-made for a specific part to be gauged. The custom process involves boring a hole in a tapered pin assembly mounting block, permanently mounting a custom made tapered pin disposed within a custom-made housing to the hole in the tapered pin assembly mounting block, and providing a compression spring between the bottom of the housing and the tapered pin. The surfaces of the assembly must be ground and hardened to provide for an accurate and a durable locating device. The custom-made assembly must be remade each time because an interchangeable pin assembly that is interchangeable with standard commercial locating pins is not readily available.

It is desirable to provide a ground locating surface located at a standard height above the mounting block for dimensionally holding the manufactured part.

It is desirable to eliminate the need for a rest pad to be used in combination with a locating pin housing as a locating surface.

It is desirable to provide a locating pin assembly that may use standard commercial locating pins to be easily and removably mounted into a mounting block.

It is desirable to provide a locating pin assembly that may easily locate holes in manufactured parts regardless of the holes' sizes.

SUMMARY OF THE INVENTION

The devices and assemblies of the present invention are premised upon the discovery of a unique locating pin assembly for locating manufactured parts used in a precision locating process.

In general, the interchangeable locating pin assembly has:

a) a locating pin housing having a body, the body having an interior portion, and a flange for locating the manufactured part;

b) a locating pin having a tapered head for engaging the manufactured part at a single contact point, and a shank complementary in shape to the interior portion of the housing body for slidably engaging the interior portion of the housing body, the shank disposed in axial alignment with the tapered head extending axially downwardly from the tapered head;

c) means for axially moving the locating pin relative to the housing between a first extended position, a second partially retracted position, and a third fully retracted position; and d) means for preventing movement of the pin relative to the housing.

The present invention thereby meets the needs identified above by providing an improved locating pin assembly for locating manufactured parts. The assembly eliminates the need to custom-make a locating pin tailored to each part. Instead the assembly can be made using standard commercial locating pins that are complementary in shape to standard commercial locating pin housings for use in many manufactured part precision locating applications.

BRIEF DESCRIPTION OF DRAWINGS

FIG. 1 is a perspective drawing of one preferred embodiment of an interchangeable locating pin assembly.

FIG. 2 is a partial exploded view of an interchangeable locating pin assembly of a preferred embodiment.

FIG. 3 is a cross sectional view (taken through FIG. 1) of an interchangeable locating pin assembly according to the present invention.

FIG. 4 is a partial perspective view of a preferred embodiment of an interior side of an interchangeable locating pin assembly.

FIG. 5 is a top view of a preferred embodiment of an interchangeable locating pin assembly.

FIG. 6 is a cross-sectional view of a preferred embodiment of an interchangeable locating pin assembly taken through FIG. 5.

DETAILED DESCRIPTION OF THE PREFERRED EMBODIMENT

Figure 7:
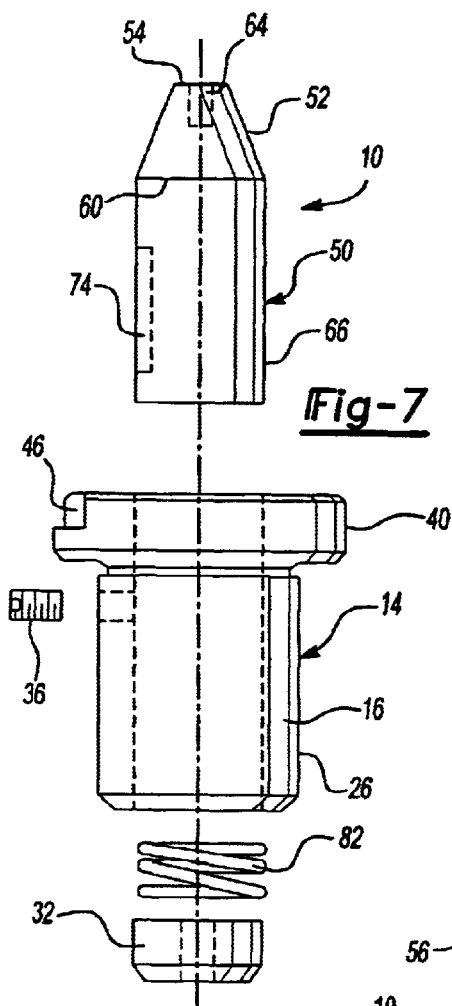
FIG. 7 is a side exploded view of a preferred embodiment of an interchangeable locating pin assembly.
Figure 8:
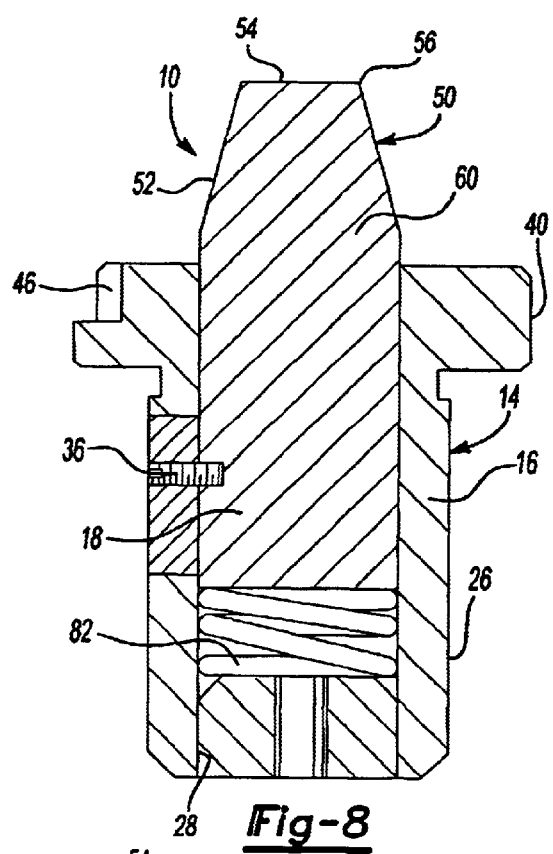
FIG. 8 is a partial side view of a preferred embodiment of the interchangeable locating pin assembly positioned in an intermediary partially retracted position.

Referring to FIGS. 1–9, there is generally disclosed an interchangeable locating pin assembly 10 for locating a manufactured part having a locating pin housing 14 and a locating pin 50. The interchangeable locating pin assembly 10 operates to engage a manufactured part at a single contact point to locate the center axis of a hole disposed within the manufactured part. The assembly 10 further operates to locate the hole of the manufactured part, regardless of the hole size, relative to another location.

The locating pin housing 14 and the locating pin 50 are preferably formed from hardened steel, however, the housing 14 and the locating pin 50 may be formed from any suitable solid material that is durable, such as plastic, thus preventing wear during repeated use. Also, preferably, the locating pin housing 14 and the locating pin 50 are coated with a corrosion resistant material such as black oxide, however any corrosion resistant may be used as a coating.

The locating pin housing 14 has a body 16 having a hollow interior portion 18 for slidably receiving the locating pin 50, and a flange 40. The hollow interior portion 18 is complementary in shape to the locating pin 50. The body 16 is preferably, cylindrical in shape and has an upper open end 20 integrally formed with the flange 40, and a lower end 22. Other tubular geometries are possible, however, in the embodiments shown, the body 16 is cylindrical. Preferably, the lower end 22 is substantially closed having a bottom plug 32 for supporting a spring as discussed further below. The bottom plug 32 preferably, has an opening 30 disposed therethrough to allow for venting of air when the housing 14 receives the locating pin 50. Optionally, the lower end bottom plug 32 may be manufactured from the same material as the body 16 or may be separately constructed, as shown in the embodiment shown in FIG. 3, the bottom plug 32 is separately constructed from the body 16 and then is integrally formed with the lower end 22 by conventional means such as welding. Optionally, as shown in FIGS. 1–4, and 6–9, the lower end 22 may be chamfered to allow for easy insertion into a mounting block recess.

The body 16 further has a wall 24 having a uniform thickness disposed between the upper open end 20 and the lower end 22. The wall 24 has an inner portion 28, and an outer portion 26. The inner portion 28 further defines the hollow interior portion 18 for slidably receiving and engaging the locating pin 50. Optionally, the wall 24 has an undercut portion 38 disposed within the outer portion 26 of the wall 24 and beneath the flange 40 to allow for machining ground surfaces.

In a preferred embodiment, as shown in FIGS. 1–8, the body 16, preferably, further has an anti-rotate stop pin 36 for slidably engaging a slot disposed within the locating pin 50. The anti-rotate stop pin 36 is preferably, fixedly attached to the locating pin housing 14 at a distance below the flange 40 equal to a distance less than an axial length of a tapered head of the locating pin 50. Preferably, when the body 16 is cylindrical, the anti-rotate stop pin 36 protrudes radially inwardly from the inner portion 28 of the wall 24 towards the hollow interior portion 18 of the housing 14. The anti-rotate stop pin 36 may be removably attached to the inner portion 28 of the wall 24 to allow for removal of the anti-rotate stop pin and for replacement of parts of the locating assembly. However, in an alternative embodiment, the anti-rotate stop pin 36 may be nonremovably attached to the inner portion 28. The anti-rotate stop pin 36 is preferably used in combination with a diamond head tapered locating pin to prevent rotation of the pin relative to the housing. However, if a round tapered head is used, the anti-rotate stop pin 36 may not be necessary.

The flange 40 has a uniform thickness and projects upwardly and outwardly from the upper open end 20 of the body 16. The flange 40 has an upper planar locating surface 44 for locating and engaging a manufactured part. The upper planar locating surface 44 is preferably ground to provide a smooth surface for engaging and supporting the manufactured part and to provide a thick tolerance for dimensionally holding the part. Additionally, the part is preferably hardened to prevent any abrasions from forming on the manufactured part when the part engages the locating surface 44. Optionally, as shown in FIGS. 1–9, the flange has a recess 46 disposed therethrough for receiving a locking-screw when the flange 40 is mounted to a mounting block by a locking-screw. Alternatively, the flange 40 may be pressure fit to a mounting block as is well-known in the mechanical and machining arts, though, the flange 40 as shown in the present embodiment incorporates the recess 46.

The locating pin 50 has a tapered head 52 and a shank 66 integrally formed therewith. The tapered head 52 may be integrally formed with the shank 66 as described further below. The tapered head 52 is preferably round or tapered but could be any geometry complementary to a hole disposed within a manufactured part.

The tapered head 52 has a top planar surface 54 having a first peripheral edge 56 defining a perimeter of the top planar surface 54. The tapered head 52 has a base portion 60 having a second peripheral edge 58 defining a perimeter of the base portion 60. The first peripheral edge perimeter is less than the second peripheral edge perimeter. The tapered head 52 further has a tapered peripheral wall 62 extending outwardly and sloping downwardly at an angle from the top planar surface 54 to the shank 66. The tapered peripheral wall 62 is further disposed between the first peripheral edge 56 and the second peripheral edge 58 such that the wall is narrower near the first peripheral edge 56 and is wider near the second peripheral edge 58.

Optionally, the tapered head 52 further may have an axial bore 64 for is partially disposed therein for grinding centers and to allow for easy positioning of the locating pin 50 in relation to a grinding machine for grinding surfaces as is well known in the machining arts.

The shank 66 is complementary in geometry to the hollow interior portion 18 of the housing 14. Preferably, as shown in FIGS. 1–9, the shank 66 is cylindrical. The shank 66 has uniform dimensions, and thus has a uniform transverse cross section. The shank 66 is integrally formed with the tapered head 52. The shank 66 has a uniform cross section, an upper planar end 68, and a lower planar end 70.

The upper planar end 68 is juxtaposed beneath the base portion 60 of the tapered head 52 wherein the second peripheral edge 58 of the tapered head 52 further defines a perimeter of the upper planar end 68. The shank 66 further has a uniform peripheral wall 72 extending between the upper planar end 68 and the lower planar end 70.

In a preferred embodiment, as shown in FIGS. 2–4, and 6–8, the shank 66 further has a longitudinal slot 74 disposed through the peripheral wall 72 for allowing travel of the locating pin 50 relative to the housing 14. Preferably, the length of the slot 74 has a length greater than the axial distance between the top planar surface 54 and the base portion 60 of the tapered head 52. The slot 74 having a top shelf 76 disposed below the upper planar end 68 of the shank 66, and a bottom shelf 78 extending downwardly from the top shelf 76 a distance greater than a longitudinal length along a center axis 80 of the locating pin 50 of the tapered head 52 between the top planar surface 54 and the base portion 60. The top shelf 76 defines a first stop member for preventing downward longitudinal movement along the locating pin center axis 80 beyond a fully retracted position of the locating pin 50 relative to the housing 14 when the housing anti-rotate stop pin 36 engages the top shelf 76. The bottom shelf 78 defines a second stop member for preventing upward longitudinal movement along the locating pin center axis 80 beyond a fully extended position of the locating pin 50 relative to the housing 14 when the housing anti-rotate stop pin 36 engages the bottom shelf 78.

The interchangeable locating pin assembly 10 further has means for preventing movement between the locating pin 50 relative to the housing 14. The means for preventing movement has a compression spring 82 disposed between the lower end bottom plug 32 and the locating pin 50. In one embodiment, as shown in FIGS. 3, and 6–8 the spring 82 engages the upper end bottom plug 32 and the lower planar end 70 of the shank 66. However, alternatively, the spring 82 may engage the lower end upper plug 32 and an interior portion within the shank 66. As shown in one embodiment, the spring 82 cooperates with the anti-rotate stop pin 36 and the slot 74 to prevent axial movement of the shank 66 relative to the housing 14.

The longitudinal slot 74 and the anti-rotate stop pin 36 cooperate to define means for axially moving the locating pin relative to the housing between a first extended position, a second partially retracted intermediary position, and a third fully retracted position.

Figure 9:
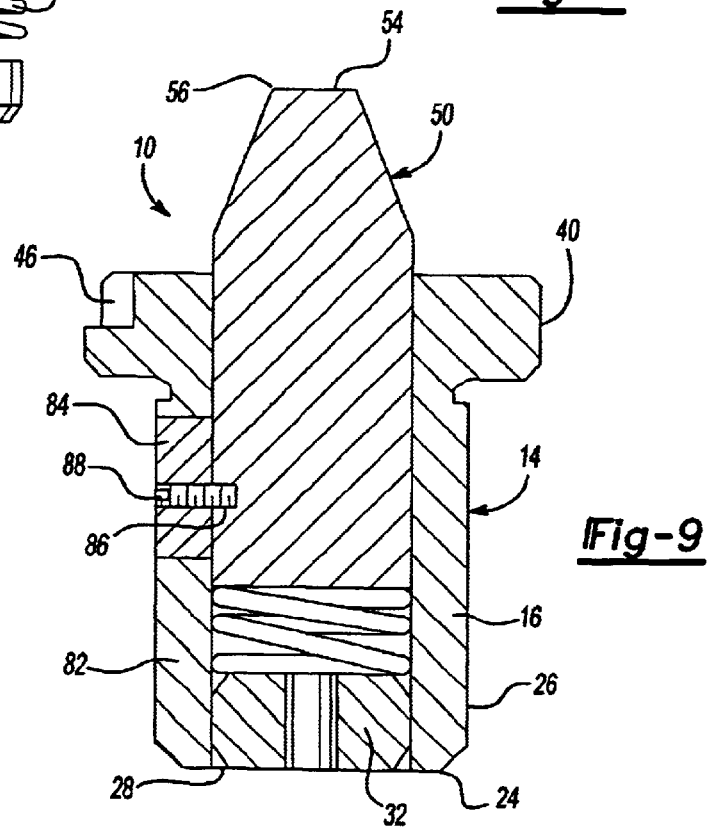
FIG. 9 is a partial perspective view of another preferred embodiment in accordance with the present invention.

In an alternative embodiment, as shown in FIG. 9, an optional slot 84 for controlling travel of the locating pin 50 relative to the housing 14 is formed through the inner portion of the wall 24 of the body 16. A recess 86 is disposed within the peripheral wall 72 of the shank. Preferably, the recess 86 is threaded for receiving a removable set-screw 88. The set-screw 88 cooperates with the slot 84 in the housing 14 to control travel of the locating pin 50 relative to the housing 14.

In general, the locating pin assembly 10 can be used in many applications for locating holes such as in gauging or machining applications. The locating pin assembly 10 may be used in a gauge checking device. The gauge checking device may have a mounting block having two recesses for receiving two interchangeable locating pin assemblies 10, a clamping assembly for clamping a manufactured part to the mounting block, and a check pin for checking the location of a first hole disposed within the manufactured part relative to a second and a third hole, disposed within the manufactured part. Advantageously, the clamping assembly may have a clamp arm, a clamp fastening assembly, and a clamp mounting block.

In operation, before engaging the manufactured part, the locating pin is biased in the first fully extended position. Then, the hole of the manufactured part engages the locating pin at a single contact point on the tapered head 52. Center axis of the second and third holes are located upon the manufactured part engaging the locating pins 10, at respective single contact points. The clamp arm engages the manufactured part and securely clamps the manufactured part with respect to the clamp mounting block thereby preventing movement of the manufactured part relative to the mounting block 94.

When the manufactured part engages the tapered heads 52 at the single contact point, the anti-rotate stop pin 36 slidably engages the slots 74 in a position between the top shelf and the bottom shelf thereby compressing the spring and moving the locating pin from the first extended position to either the second partially retracted position or the third fully retracted position within the housing.

Alternatively, when the manufactured part engages the tapered head 52 at the single contact point, the set screw 88 slidably engages the housing slot 84 thereby compressing the spring and moving the locating pin 50 from the first extended position respectively to either the second partially retracted position or the third fully retracted position.

The clamping process moves the locating pin 50 to the second partially retracted position if the diameter of the second hole is greater than the first peripheral edge 56 perimeter of the tapered head 52 but is less than the second peripheral edge 58 perimeter of the tapered head 52; or to a fully retracted position if the diameter of the second hole is equal to or less than the first peripheral edge 56 perimeter of the tapered head 52. The movement of the locating pin 50 relative to the housing 14 stops when the manufactured part engages the upper planar locating surface 44 of the flange 40. The first hole position is then checked by the check pin to determine if the first hole is properly located relative to the second and third hole respectively. Thus, the locating pin assemblies 10, operates to locate holes on the manufactured part.

It will be appreciated from the above that the needs in the art are met by the devices and assemblies of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An interchangeable locating pin assembly for locating a manufactured part comprising:

a) a locating pin housing having a body, the body having an interior portion, and a flange for locating the manufactured part;

b) a locating pin having a tapered head for engaging the manufactured part at a single contact point, and a shank complementary in shape to the interior portion of the housing body for slidably engaging the interior portion of the housing body, the shank disposed in axial alignment with the tapered head extending axially downwardly from the tapered head;

c) means for axially moving the locating pin relative to the housing between a first extended position, a second partially retracted position, and a third fully retracted position;

d) means for preventing movement of the pin relative to the housing;

e) an open upper end;

f) a substantially closed lower end having a bottom plug integrally formed therewith; and g) a wall having a uniform thickness disposed between the upper open end and the lower end, the wall having an outer portion and an inner portion, the inner portion further defining the hollow interior portion for slidably receiving and engaging the locating pin.

2. The assembly of claim 1, wherein the body further comprises an undercut portion disposed within the exterior portion of the wall beneath the flange.

3. The assembly of claim 1, wherein the flange projects upwardly and outwardly from the upper open end of the body and further comprises:

a) a uniform thickness; and
b) an upper planar locating surface for locating and engaging a manufactured part.

4. The assembly of claim 3, wherein the flange further comprises:
   a recess disposed therethrough for receiving a locking-screw.

5. The interchangeable locating pin assembly of claim 1 wherein the tapered head further comprises:
   a) a top planar surface having a first peripheral edge defining a perimeter of the top planar surface;
   b) a base portion having a second peripheral edge defining a perimeter of the base portion, wherein the first peripheral edge perimeter is less than the second peripheral edge perimeter; and
   c) a tapered peripheral wall extending outwardly and sloping downwardly at an angle from the top planar surface to the shank, the tapered peripheral wall is further disposed between the first peripheral edge and the second peripheral edge, wherein the wall is narrower near the first peripheral edge and is wider near the second peripheral edge.

6. The assembly of claim 5, wherein the shank is integrally formed with the tapered head and further comprises:
   a) a uniform transverse cross section;
   b) an upper planar end juxtaposed beneath the base portion of the tapered head wherein the second peripheral edge of the tapered head further defines a perimeter of the upper planar end;
   c) a lower planar end; and
   d) a uniform peripheral wall extending between the upper planar end and the lower planar end.

7. The assembly of claim 6, wherein the body further comprises:
   an anti-rotate stop pin protruding inwardly from the inner portion of the wall towards the hollow interior portion of the housing for slidably engaging a slot disposed within the locating pin, the anti-rotate stop pin fixedly attached to the locating body housing at a distance below the flange equal to a distance less than a longitudinal distance between the upper planar end and the base portion of the tapered head.

8. The assembly of claim 6, wherein the body further comprises a slot disposed through the inner portion of the wall of the body for controlling travel of the locating pin relative to the housing.

9. The assembly of claim 7, wherein the shank further comprises:
   a longitudinal slot disposed through the uniform peripheral wall of the shank for controlling travel of the locating pin relative to the housing, the slot having a top shelf flush with the upper planar end of the shank, and a bottom shelf extending downwardly from the top shelf; and
   wherein the anti-rotate stop pin slidably engages the slot between the top shelf and the bottom shelf.

10. The assembly of claim 9, wherein the slot and the anti-rotate stop pin cooperate to define the means for axially moving the locating pin relative to the housing between a first extended position, a second partially retracted intermediary position, and a third fully retracted position.

11. The assembly of claim 8, wherein the shank further comprises:
   a) a recess formed within the peripheral wall of the shank; and
   b) a removable set screw disposed within the recess, wherein the set screw engages the slot in the body and cooperates with the slot to control travel of the locating pin relative to the housing.

12. The assembly of claim 11, wherein the slot and the set-screw cooperate to define the means for axially moving the locating pin relative to the housing between a first extended position, a second partially retracted intermediary position, and a third fully retracted position.

13. The assembly of claim 10, wherein the means for preventing movement between the locating pin relative to the housing comprises:
   a compression spring disposed between the lower end bottom plug and the locating pin.

14. An interchangeable locating pin assembly for locating a manufactured part comprising:
   a) a locating pin housing having a body, the body having
      i) a hollow interior portion,
      ii) an open upper end,
      iii) a substantially closed lower end having a bottom plug integrally formed therewith, and
      iv) a wall having a uniform thickness disposed between the upper open end and the lower end, the wall having
         A) an outer portion, and
         B) an inner portion, the body further having
      v) an anti-rotate stop pin protruding inwardly from the inner portion of the wall towards the hollow interior portion of the housing;
   b) a flange for locating the manufactured part;
   c) a locating pin having
      i) a tapered head for engaging the manufactured part at a single contact point, and
      ii) a shank, the shank is complementary in shape to the interior portion of the housing body for slidably engaging the interior portion of the housing body, and is disposed in axial alignment with the tapered head extending axially downwardly from the tapered head, the shank further having
         A) a uniform transverse cross section,
         B) an upper planar end juxtaposed beneath the base portion of the tapered head wherein the second peripheral edge of the tapered head further defines a perimeter of the upper planar end,
         C) a lower planar end,
         D) a uniform peripheral wall extending between the upper planar end and the lower planar end, and
         E) a slot formed within the uniform peripheral wall, a longitudinal slot disposed through the uniform peripheral wall of the shank for allowing travel of the locating pin relative to the housing, the slot having a top shelf flush with the upper planar end of the shank, and a bottom shelf extending downwardly from the top shelf, wherein the anti-rotate stop pin slidably engages the slot between the top shelf and the bottom shelf, the anti-rotate stop pin fixedly attached to the locating body housing at a distance below the flange equal to a distance greater than an axial longitudinal length of the tapered head, and wherein the slot and the anti-rotate stop pin cooperate to move the locating pin relative to the housing between a first extended position, a second partially retracted position, and a third fully retracted position; and
   d) means for preventing movement of the pin relative to the housing.

15. The assembly of claim 14, wherein the means for preventing movement between the locating pin relative to the housing comprises:
a compression spring disposed between the lower end bottom plug and the locating pin.

16. The assembly of claim 15, wherein the spring is further disposed between the lower end bottom plug and an interior portion of the locating pin shank.

17. An interchangeable locating pin assembly for locating a manufactured part comprising:
   a) a locating pin housing having a body, the body having
      i) an interior portion,
      ii) an open upper end,
      iii) a substantially closed lower end having a bottom plug integrally formed therewith, and
      iv) a wall having a uniform thickness disposed between the upper open end and the lower end, the wall having an outer portion and an inner portion,
      v) a slot disposed through the inner portion of the wall of the body, and
   b) a flange for locating the manufactured part;
   c) a locating pin having
      i) a tapered head for engaging the manufactured part at a single contact point, the tapered head having
         A) a top planar surface having a first peripheral edge defining a perimeter of the top planar surface,
         B) a base portion having a second peripheral edge defining a perimeter of the base portion, wherein the first peripheral edge perimeter is less than the second peripheral edge perimeter, and
         C) a tapered peripheral wall extending outwardly and sloping downwardly at an angle from the top planar surface, the tapered peripheral wall is further disposed between the first peripheral edge and the second peripheral edge, wherein the wall is narrower near the first peripheral edge and is wider near the second peripheral edge, and
      ii) a shank complementary in shape to the interior portion of the housing body for slidably engaging the interior portion of the housing body, the shank disposed in axial alignment with the tapered head extending axially downwardly from the tapered head having
         A) a recess formed within the peripheral wall of the shank, and
         B) a removable set screw disposed within the recess, wherein the set screw engages the slot in the body and cooperates with the slot to control travel of the locating pin relative to the housing by axially moving the locating pin relative to the housing between a first extended position, a second partially retracted intermediary position, and a third fully retracted position; and
   d) a compression spring disposed between the a bottom plug and the shank for preventing movement of the pin relative to the housing.

18. The assembly of claim 17, wherein the body is cylindrical.

* * * * *